3,073,869
HALOGENATION PROCESS
Delbert L. Hanna and Alexis J. Rudnitzki, Chicago, Ill., assignors to Velsicol Chemical Corporation, Chicago, Ill., a corporation of Illinois
No Drawing. Filed Nov. 7, 1960, Ser. No. 67,486
5 Claims. (Cl. 260—648)

This invention relates to a new process for the chlorination of cyclopentadiene. In particular this invention relates to the production of hexachlorocyclopentadiene by thermal (i.e. non-catalytic) chlorination of cyclopentadiene.

Hexachlorocyclopentadiene being a readily reactive, halogenated compound has evidenced a strong growth in its commercial usage. It is of particular value as an intermediate in the production of a variety of commercial products including pesticides and fire resistant ingredients for a multitude of industrial applications.

Various processes for the production of hexachlorocyclopentadiene are known, principally those based on the work of Straus et al., consisting of the reaction of cyclopentadiene and sodium hypochlorite, and by the pyrolysis of octachlorocyclopentene.

These known procedures entail several disadvantages. Thus, for example, the preparation of hexachlorocyclopentadiene by the method of Straus et al., produces underchlorinated material which is extremely difficult to separate from hexachlorocyclopentadiene by normal separation procedures such as fractional distillation. Similarly the production of this desired material by the pyrolysis of octachlorocyclopentene is encumbered by the necessity of using high temperatures and/or catalysts in obtaining the octachlorocyclopentene in satisfactory yields in reasonable reaction times.

It is therefore an object of the present invention to produce hexachlorocyclopentadiene by a straightforward chlorination process in quantitative yields.

Another object of the present invention is to produce hexachlorocyclopentadiene by the chlorination of cyclopentadiene without the use of catalyst.

Another object of the present invention is the production of hexachlorocyclopentadiene of high purity substantially free of the undesired underchlorinated products.

Another object of the present invention is the production of high purity hexachlorocyclopentadiene in commercially practical yields without the necessity of extensive purification procedures.

Unexpectedly it has been found that high purity hexachlorocyclopentadiene can be prepared in excellent yields by the direct non-catalytic reaction of liquid cyclopentadiene and chlorine. By a direct reaction it is meant that there is no separation or apparent preparation of octachlorocyclopentene as would be expected in view of the prior art.

In essence the present process entails low temperature chlorination of cyclopentadiene to a mixture of chlorinated products composed substantially of tetrachlorocyclopentane and controlled chlorination of the tetrachlorocyclopentane to substitute therein an additional mole of chlorine to form a mixture of chlorinated products composed substantially of hexachlorocyclopentane, followed by a dehydrogenation reaction to produce the desired hexachlorocyclopentadiene. The present process is of extreme novelty and of great economy since it allows for the formation of this valuable product without the prior formation and separation of higher chlorinated material, especially octachlorocyclopentene.

A procedure has heretofore been proposed for the production of hexachlorocyclopentadiene from cyclopentadiene by a two-stage chlorination to form octachlorocyclopentene which is then pyrolyzed to the desired hexachlorocyclopentadiene. This prior process involves first a low temperature chlorination of the cyclopentadiene comparable to the first-stage reaction of applicants, to add approximately 2 moles of chlorine, forming in essence "tetrachlorocyclopentane" which as described is actually ... "a mixture comprised predominantly of $C_5H_6Cl_4$ and $C_5H_5Cl_5$ and having an average composition of $C_5H_6-xCl_4+x$, $x$ varying from 0 to 1." Then in accordance with said procedure, this "tetrachlorocyclopentane" is further chlorinated at temperatures increasing to approximately 275° C. to produce the octachlorocyclopentene which is then pyrolyzed.

It has now been found that by carefully controlling the temperature at which the tetrachlorocyclopentane is chlorinated, the chlorination can be regulated so as to substitute an average of one mol of chlorine per mol of tetrachlorocyclopentane into this latter. This product like the tetrachlorocyclopentane is a mixture, the predominant component being hexachlorocyclopentane.

In order to obtain the desired hexachlorocyclopentadiene from the aforementioned hexachlorocyclopentane, the latter is dehydrogenated by reaction with additional chlorine. This final stage reaction of the present process, without the need of further purification, produces product of about 90–98% hexachlorocyclopentadiene content. This product can be readily upgraded, if necessary, by fractional distillation since the major impurities present in the product have boiling points substantially different from that of hexachlorocyclopentadiene. At no stage in the present process is use made of catalyst, a possibility not recognized by previous work.

More specifically the first stage of the present process involves reacting liquid cyclopentadiene and chlorine at relatively low temperatures so as to add a minimum of four chlorine atoms per mol of cyclopentadiene. Generally the temperature for this liquid phase reaction should be maintained between about 0° C. and about 100° C., it being preferred to perform this reaction at a temperature below about 60° C., with optimum practical results being obtained at reaction temperatures between about 20–60° C.

During the first stage chlorination reaction it is necessary that the reaction mixture be saturated with chlorine so as to substantially prevent the formation of underchlorinated material. Likewise due to the tendency of cyclopentadiene to polymerize in the presence of chlorine it is necessary to prevent any appreciable build-up of cyclopentadiene. This undesired polymerization can be eliminated by quick dilution of the cyclopentadiene.

While the theoretically required amount of chlorine is 2 moles per mol of cyclopentadiene, the necessity of maintaining a saturated reaction mixture so as to prevent polymerization requires the use of excess chlorine. The necessary excess varies with the reaction temperature but generally cyclopentadiene: chlorine ratios between about 1:2 and 1:4 are sufficient, the exact concentration not being critical. Actually a chlorine excess of about 50% is not of consequential value.

Superatmospheric pressure is not required for this low temperature reaction, but since there is involved a gaseous reactant, a closed reaction vessel is employed for the first stage. The reaction time is relatively short, up to about 5 hours, and is dependent on the reaction temperature, pressure if employed, concentration of reactants, type of equipment and whether the process is conducted as a batch or continuous operation.

The resulting reaction mixture from the first stage low temperature chlorination reaction is then further chlorinated while in the liquid phase with chlorine in a second stage closed reaction vessel.

In this second stage reaction of the present process the reaction temperature is of critical importance. The second stage reaction in essence is the reaction of the previously described first stage reaction product and chlorine at a temperature between about 140° C. and below 190° C. and preferably between about 150° C. and about 175° C. to produce a reaction product containing an average of 6 chlorine atoms per mol of cyclopentadiene. As in the case of the first stage chlorination, no catalyst is employed. At temperatures above this critical area, as discussed previously, there is produced octachlorocyclopentene.

As in the first stage reaction, this second stage reaction is performed using atmospheric pressure, although superatmospheric pressures can be advantageous.

Theoretically 2 mols of chlorine are required per mol of tetrachlorocyclopentane material. Tetrachlorocyclopentane: chlorine ratios between about 1:2 and 1:6 are satisfactory. The presence of chlorine in amounts above this 200% excess is not of value.

In both the first and second stage reactions of the present process, the chlorination reactions are performed in the absence of catalyst. Actually the presence of certain materials such as iron has been found to be detrimental to the preparation of high purity product and accordingly should be kept out of the reaction mixtures.

While each of the various liquid phase chlorination reactions of the present process can be performed as a batch process, it is a preferred embodiment of the present process to use it as a continuous process. This particularly so for the first two stages since they are both liquid phase chlorination reactions, the second using the product of the first as its starting material. In utilizing a continuous process for the first two reactions, the chlorine can be introduced countercurrent to the process stream, i.e., being introduced into the second stage reaction and then into the first stage reaction. This procedure will be more fully explained in the working examples.

In the third and final stage reaction of the present process, the hexachlorinated product of the second stage reaction is reacted in the vapor phase with chlorine so as to yield the desired high purity hexachlorocyclopentadiene.

Since the reaction is performed in the vapor phase, it is necessary to vaporize the hexachlorocyclopentane reactant. This can be readily performed by heating to a temperature of at least 400° C. preferably 400°–700° C. in the presence of the requisite quantity of chlorine. The theoretical quantity of chlorine for this reaction is 2 moles per mol of hexachlorinated material. It is desirable to have present an excess of chlorine so as to prevent undesirable polymerization, hexachlorocyclopentane: chlorine ratios between about 1:2 and 1:4 being operable, with additional chlorine not being of value.

The actual reaction temperature should be above about 400° C., with the optimum temperature depending in part upon the reaction time. Temperatures above about 500° C. are preferred with excessively high temperatures not being of value. Accordingly reaction temperatures between about 500° C. to 700° C. are of practical value.

At the above temperatures, the reaction time is extremely short in the order of a few seconds. Generally reaction times of from about 0.5 to 5 seconds are sufficient, with the precise time depending upon the reaction conditions and equipment.

As in the case of the liquid phase reactions, the vapor phase reaction is normally conducted on a continuous basis. Also as in the case of the liquid reactions no catalyst is required and the presence of contaminants such as iron should be avoided.

Thus it can be seen that the present process utilizes three non-catalytic reactions or stages, two in the liquid phase and one vapor phase in producing substantially quantitative yields of hexachlorocyclopentadiene, i.e. 90–98%. If even higher purity product is required this can be readily accomplished by fractional distillation. By use of this method of purification hexachlorocyclopentadiene of 98% and higher assay is obtainable.

The following examples are exemplary of the present process.

EXAMPLE 1

Carbon tetrachloride was placed in a 5-necked glass reaction flask. Chlorine gas was added so as to saturate the carbon tetrachloride. The purpose of the carbon tetrachloride was to insure the presence of the necessary excess of chlorine and required dilution of cyclopentadiene preventing undesired polymerization. Cyclopentadiene was then continuously added to the reaction mixture while the chlorine gas was continuously incorporated. Throughout the reaction, the mixture was maintained at a temperature of approximately 40° C. The desired tetrachlorocyclopentane was then freed from the carbon tetrachloride by distillation in the presence of excess chlorine. Additional chlorine was injected and the temperature maintained at 150° C. Approximately quantitative yields of the desired hexachlorinated second stage product were recovered therefrom. Analysis showed it to contain 75.7% chlorine.

EXAMPLE 2

*Preparation of Hexachlorocyclopentadiene*

The product of Example 1 was continuously introduced at a rate of 2 milliliters per minute into a vertical nickel tube packed wtih porcelain Beryl saddles and heated by an electric furnace. Concurrently chlorine was continuously introduced into the reactor through a separate inlet tube. The reaction temperature was maintained at 500° C. whereas the chlorine rate was varied so as to perform the reaction with varying excess of chlorine.

Initially the chlorine rate was held at 4.3 grams per minute for 20 minutes equivalent to 180% excess chlorine. Gas chromatographic analysis showed the product contained 97.2% hexachlorocyclopentadiene.

The chlorine rate was then lowered to 3.1 grams per minute equivalent to 100% excess chlorine. Product recovered during 35 minutes after changing the chlorine rate was found by gas chromatographic analysis to contain 98.2% hexachlorocyclopentadiene.

Next the chlorine rate was adjusted to 2.7 grams per minute equivalent to 75% excess chlorine. Product recovered for 25 minutes after adjusting the chlorine was found by gas-liquid partition chromatographic analysis to contain 98.4% hexachlorocyclopentadiene.

Then the chlorine rate was changed to 2.3 grams per minute equivalent to a 50% chlorine excess. After 25 minutes at this rate the product was analyzed by gas chromatography and found to contain 98.4% hexachlorocyclopentadiene.

Finally the chlorine rate was lowered to 1.9 grams per minute equivalent to a 25% excess of chlorine. After 30 minutes at this rate the product was found by gas-liquid partition chromatographic analysis to contain 97.4% hexachlorocyclopentadiene.

EXAMPLE 3

A glass reactor was primed with previously prepared tetrachlorocyclopentane. This liquid was saturated with chlorine gas and heated to 40° C. Cyclopentadiene and gaseous chlorine were continuously introduced into the reaction mixture maintained at 40° C. A quantitative yield of 1½ liters of first stage chlorinated reaction mixture compound substantially of tetrachlorocyclopentane was recovered. This material was placed in a reactor, saturated with chlorine and with the continuous introduction of chlorine maintained at about 150° C. for several hours. Its chlorine content was about 75%.

EXAMPLE 4

*Production of Hexachlorocyclopentadiene*

The product of Example 3 was introduced into a reactor equipped for continuous feed of said product at a rate of 2 milliliters per minute and chlorine was introduced at a rate of 5 grams per minute. The temperature of the reaction was held at 450° C. Quantitative yields of product found by gas-liquid partition chromatographic analysis to contain 94.9% hexachlorocyclopentadiene.

EXAMPLE 5

*Production of Hexachlorocyclopentadiene*

The process of Example 4 was repeated at a temperature of 550° C. resulting in a quantitative amount of product found by gas-liquid partition chromatographic analysis to contain 97.0% hexachlorocyclopentadiene.

EXAMPLE 6

*Production of Hexachlorocyclopentadiene*

The process of Example 4 was repeated using a reaction temperature of 600° C. Quantitative yields of hexachlorocyclopentadiene found by gas-liquid partition chromatographic analysis to be 97.4% hexachlorocyclopentadiene were obtained.

EXAMPLE 7

A reaction flask was primed with previously prepared tetrachlorocyclopentane, saturated with chlorine and heated to 60° C. Cyclopentadiene (1100 cc.) was added thereto over a 2½ hour period during which chlorine was also added and the desired first stage reaction product recovered.

This product was then reacted with chlorine at 150° C. to produce second stage reaction product in accordance with the present process and finally chlorinated in the vapor phase to produce high purity hexachlorocyclopentadiene.

EXAMPLE 8

The process of Example 7 was performed except that the reaction of cyclopentadiene and chlorine was performed at a temperature of 80° C. During the reaction, 1700 cc. of cyclopentadiene were introduced over a 3½ hour period. Chlorine was introduced at a rate of about 30 grams per minute. This product was substantially identical to that of Example 7.

EXAMPLE 9

Cyclopentadiene was fed into the first stage reactor and the product of the first stage, substantially tetrachlorocyclopentane, was discharged into the second stage reactor. Chlorine was introduced into the second stage reactor and the gaseous stream therefrom, containing chlorine and the hydrogen chloride by-product entered the first stage reactor as the required chlorine reactant. The temperature of the first stage reactor was maintained at about 40° C. and the second stage reactor at 160–165° C. Cyclopentadiene was fed into the first stage reactor at a rate of 10 pounds per hour and chlorine was fed into the second stage reactor at a rate of 55 pounds per hour. This substantially hexachlorocyclopentane product contained 76.7% chlorine.

EXAMPLE 10

*Production of Hexachlorocyclopentadiene*

The product produced in Example 9 was vaporized at a temperature of 300–340° C. and fed into a reactor maintained at 550° C. at a rate of 25 pounds per hour. Chlorine was continously introduced at a rate of 40 pounds per hour corresponding to a 200% excess of chlorine. This gave a reaction time of about 1.2 second. Hexachlorocyclopentadiene recovered from the process was found by gas-liquid partition chromatographic analysis to be 95% hexachlorocyclopentadiene.

EXAMPLE 11

*Production of Hexachlorocyclopentadiene*

The product produced as in Example 9 (450 grams) was fed into a reactor at a rate of 2 milliliters per minute. Chlorine was introduced at a rate of 4.6 grams per minute and the reaction temperature maintained at about 500° C. A 100% yield of hexachlorocyclopentadiene of 94.5% purity as determined by gas-liquid partition chromatography was obtained.

We claim:

1. The process for the production of substantially quantitative yields of hexachlorocyclopentadiene which comprises reacting liquid cyclopentadiene and chlorine in a first stage at a temperature from about 0 to about 100° C. until a minimum of four chlorine atoms has been added per mole of cyclopentadiene, heating the resultant liquid reaction mixture in a second stage at a temperature of from about 140° C. to below 190° C. with chlorine until the cyclopentadiene reactant contains an average of about six chlorine atoms per mol of cyclopentadiene, and vaporizing and heating the resulting reaction mixture in a third stage in the presence of chlorine to a temperature of above about 400° C. and recovering therefrom hexachlorocyclopentadiene.

2. The process for the production of substantially quantative yields of hexachlorocyclopentadiene which comprises reacting liquid cyclopentadiene and chlorine in a first stage at a temperature from about 0 to about 100° C. until a minimum of four chlorine atoms has been added per mole of cyclopentadiene, heating the resultant liquid reaction mixture in a second stage at a temperature of from about 150° C. to below 175° C. with chlorine until the cyclopentadiene reactant contains an average of about six chlorine atoms per mol of cyclopentadiene, and vaporizing and heating the resulting reaction mixture in a third stage in the presence of chlorine to a temperature of from about 400° C. to about 700° C., and recovering therefrom hexachlorocyclopentadiene.

3. The process for the production of substantially quantative yields of hexachlorocyclopentadiene which comprises reacting liquid cyclopentadiene and chlorine in a molar ratio of between about 1:2 and 1:4 respectively in a first stage at a temperature from about 20 to about 60° C. until a minimum of four chlorine atoms has been added per mole of cyclopentadiene, heating the resultant liquid reaction mixture in a second stage at a temperature of from about 150° C. to below 175° C. with chlorine in a molar ratio between 1:2 and 1:6 respectively until the cyclopentadiene reactant contains an average of about six chlorine atoms per mol of cyclopentadiene, and vaporizing and heating the resulting reaction mixture in a third stage in the presence of chlorine in a ratio of 1:2 and 1:4 respectively to a temperature of from about 400° C. to about 700° C., and recovering therefrom product containing a minimum of 90% hexachlorocyclopentadiene.

4. A thermal process for the production of substantially quantitative yields of hexachlorocyclopentadiene which comprises reacting wholly in the absence of iron, liquid cyclopentadiene and chlorine in a first stage at a temperature from about 20 to about 60° C. until a minimum of four chlorine atoms has been added per mole of cyclopentadiene, heating the resultant liquid reaction mixture in a second stage at a temperature of from about 150° C. to below 175° C. with chlorine until the cyclopentadiene reactant contains an average of about six chlorine atoms per mole of cyclopentadiene, and vaporizing and heating the resulting reaction mixture in a third stage in the presence of chlorine to a temperature of from about 400° C. to about 700° C., and recovering therefrom hexachlorocyclopentadiene.

5. The process for the production of substantially quantitative yields of hexachlorocyclopentadiene which comprises reacting a chlorinated cyclopentadiene reaction mixture composed substantially of tetrachlorocyclopentane at a temperature of from about 140° C. to below 190° C.

with chlorine until the product contains an average of about six chlorine atoms per mol of cyclopentadiene, and vaporizing and heating the resulting reaction mixture in the presence of chlorine to a temperature of from about 400° C. to about 700° C., and recovering therefrom hexachlorocyclopentadiene.

References Cited in the file of this patent

UNITED STATES PATENTS

| | | |
|---|---|---|
| 2,509,160 | McBee et al. | May 23, 1950 |
| 2,900,420 | Lidov | Aug. 18, 1959 |